US011543526B2

(12) United States Patent
Dutton et al.

(10) Patent No.: US 11,543,526 B2
(45) Date of Patent: Jan. 3, 2023

(54) COMPACT DEPTH SENSOR MODULE

(71) Applicant: STMicroelectronics (Research & Development) Limited, Marlow (GB)

(72) Inventors: Neale Dutton, Edinburgh (GB); Christopher Townsend, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 326 days.

(21) Appl. No.: 16/896,725

(22) Filed: Jun. 9, 2020

(65) Prior Publication Data

US 2021/0382172 A1    Dec. 9, 2021

(51) Int. Cl.
*G01S 17/10* (2020.01)
*G01B 11/22* (2006.01)
*G01S 7/481* (2006.01)

(52) U.S. Cl.
CPC .............. *G01S 17/10* (2013.01); *G01B 11/22* (2013.01); *G01S 7/4815* (2013.01); *G01S 7/4816* (2013.01)

(58) Field of Classification Search
None
See application file for complete search history.

(56) References Cited

U.S. PATENT DOCUMENTS

| 8,363,157 B1 | 1/2013 | Han |
| 8,803,967 B2 | 8/2014 | Oggier et al. |
| 9,380,224 B2 | 6/2016 | Keskin et al. |
| 10,386,468 B2 | 8/2019 | Ryu et al. |
| 2005/0110964 A1 | 5/2005 | Bell et al. |
| 2018/0232899 A1 | 8/2018 | Lansel et al. |
| 2021/0099618 A1* | 4/2021 | O .......................... H04N 5/2256 |

FOREIGN PATENT DOCUMENTS

WO    WO-2021059708 A1 *    4/2021    .........  H01S 5/02345

OTHER PUBLICATIONS

"[News] [Talking Tech #1] All About the ToF 3D Depth Sensing Camera !," Mi Community, Apr. 8, 2019, 2 pages.
"O3D 3D sensor with PMD Time-of Flight technology," O3D Technology—IFM Electronic, Nov. 13, 2019, 3 pages.
"The Basler TOF 3D Camera," DVC, Nov. 13, 2019, https://www.machinevision.nl/en/mv-components/3d-cameras-and-sensors/basler-tof-camera, 2 pages).
"Time-of-Flight Camera is Powered by Jefson TX2," Jun. 19, 2019, linuxgizmos.com/time-of-flight-camera-is-powered-by-jetson-tx2/, 3 pages.

* cited by examiner

*Primary Examiner* — Christopher Braniff
(74) *Attorney, Agent, or Firm* — Crowe & Dunlevy

(57) ABSTRACT

Disclosed herein is a time of flight sensing module that includes a reflected laser light detector formed on a printed circuit board, and a plurality of laser modules positioned about a periphery of the reflected laser light detector. Each laser module includes an interposer substrate vertically spaced apart from the printed circuit board, at least one laser diode carried by the interposer substrate, and a diffuser spaced apart from the interposer substrate and over the at least one laser diode. A lens may be positioned over the reflected laser light detector, and the plurality of laser modules are positioned about the periphery of the lens.

14 Claims, 6 Drawing Sheets

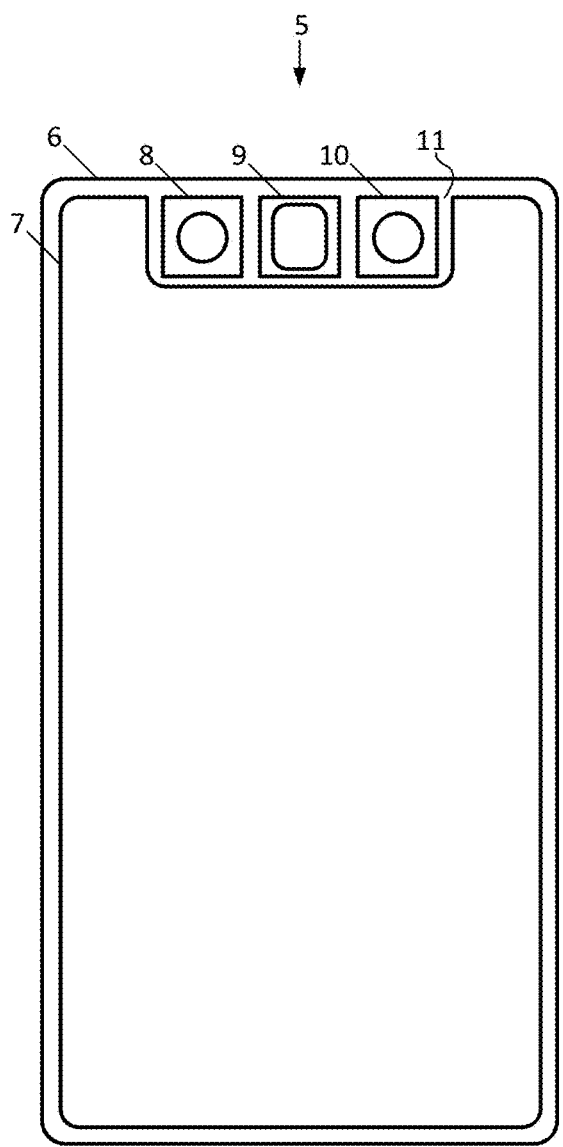
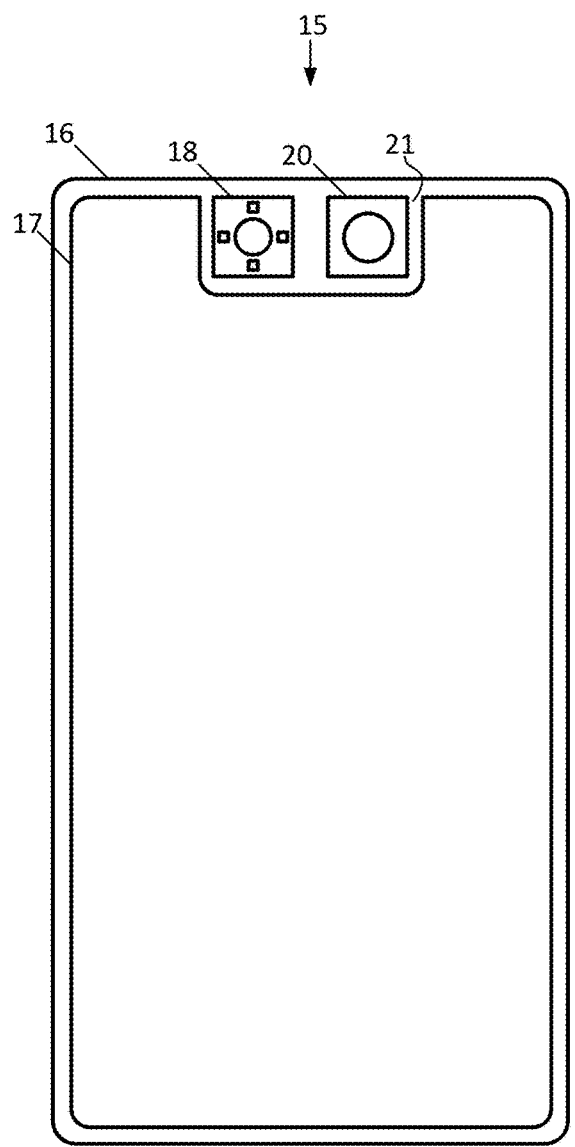
FIG. 1
(Prior Art)
FIG. 2

COMPACT DEPTH SENSOR MODULE

TECHNICAL FIELD

This disclosure is related to the field of time of flight based depth sensor modules and, in particular, to a compact time of flight based depth sensor module that has multiple laser emitters positioned about the periphery of a light detector.

BACKGROUND

Time of flight systems are used to measure distance to a target, and are therefore (among other applications) utilized in depth sensor modules. There are two general classifications of time of flight systems, namely direct and indirect.

With direct time of flight systems, a laser diode (typically infrared) is driven with a pulsed drive current to cause it to emit a short laser pulse in a given direction. This laser pulse is reflected by a possible object in that given direction, and a receiver receives and reads the reflected laser pulse. The receiver, with a proper timing reference, measures the elapsed time between emission of the laser pulse and receipt of the reflected laser pulse. From this elapsed time, the distance to the object can be evaluated.

With indirect time of flight systems, a laser diode (typically infrared) is continuously modulated to emit sinusoidal laser light in a given direction. This modulated sinusoidal laser light is reflected by a possible object in the given direction, and a receiver receives and reads the reflected sinusoidal laser light. The receiver compares the phase difference between the reflected sinusoidal laser light and the emitted sinusoidal laser light, and from this phase difference, the distance to the object can be determined.

These time of flight systems can be used to generate a depth map of the target, and the generated depth map may be compared to a stored depth map in order to determine whether the target is a known target. Due to this capability, time of flight based depth sensor modules may be utilized on the front face of a smartphone, tablet, laptop, or other electronic device for security applications. In such security applications, the "target" is the user's face, and by generating a depth map of the user's face and comparing this depth map to stored depth maps corresponding to the faces of authorized users, the depth sensor module may be used by the electronic device to determine whether the current user is an authorized user.

Clearly, locating a time of flight based depth sensor module on a front face of a smartphone or other electronic device consumes surface area on the front face that could otherwise be used by the screen. It is commercially desirable for smartphones and other electronic devices to have as close to a 1:1 screen size to front face size as possible. Therefore, known smartphone designs, such as that of the smartphone 5 shown in FIG. 1, have a screen 7 with a notch 11 cut therein, and with a depth sensor module (formed by a laser diode array 9 used for emitting laser light toward the target and a laser light detector 10 used for sensing the laser light that has reflected off the target and returned to the smartphone 5) located in the notch 11. As shown, a camera module 8 is also commonly located in the notch 11. While this smartphone 5 design allows for a relatively high ratio of the size of the screen 7 to the size of the front face of the body 6, it is desirable for that ratio to be improved, which could be accomplished if the size of the notch 11 could be reduced. While the depth sensor module could be removed to permit shrinking of the notch 11, this would remove the security functionality provided by the depth sensor module.

Therefore, further development into the area of depth sensor modules is needed so that a smaller depth sensor module can be devised. Such a smaller depth sensor module would not only allow the shrinking of the notch in the screen of smartphones, but would also allow space saving on the rear face of smartphones, since depth sensor modules may also be used on the rear face of smartphones in a variety of applications.

SUMMARY

Disclosed herein is a time of flight sensing module including: a reflected laser light detector formed on a printed circuit board; and a plurality of laser modules positioned about a periphery of the reflected laser light detector, each laser module being formed from an interposer substrate vertically spaced apart from the printed circuit board, at least one laser diode carried by the interposer substrate, and a diffuser spaced apart from the interposer substrate and over the at least one laser diode.

A lens may be positioned over the reflected laser light detector, and the plurality of laser modules may be positioned about the periphery of the lens.

The plurality of laser modules may be equally spaced about the periphery of the lens.

The plurality of laser modules may be unequally spaced about the periphery of the lens.

The interposer substrate of each of the plurality of laser modules may be carried adjacent the periphery of the lens at a level above the reflected light detector but below a top surface of the lens. In addition, the diffuser of each of the plurality of laser modules may be carried adjacent the periphery of the lens at a level such that a top surface of the diffuser is even with a top surface of the lens.

At least two of the plurality of laser modules may share a single common interposer, with the at least one laser diode and diffuser of each of the at least two of the plurality of laser modules being associated with that single common interposer.

At least two of the plurality of laser modules may share a single common interposer, with the at least one laser diode and diffuser of each of the at least two of the plurality of laser modules being associated with that single common interposer. Additionally, in some cases, at least one of the plurality of laser modules does not share its interposer with others of the plurality of laser modules.

Also disclosed herein is a time of flight sensing module including: a reflected laser light detector formed on a printed circuit board; and a plurality of laser modules positioned about a periphery of the reflected laser light detector, each laser module being formed of an interposer substrate and at least one laser diode carried by the interposer substrate, with the at least one laser diode having a barrel shaped upper surface so as to cause a desired divergence of laser light emitted by the at least one laser diode.

A diffuser may be spaced apart from the interposer substrate and over the at least one laser diode.

A lens may be positioned over the reflected laser light detector, and each laser module may be positioned such that a top surface of its at least one laser diode is at a level even with a top surface of the lens.

Each laser module may be formed of an interposer substrate and a plurality of laser diodes carried by the interposer substrate, with each of the plurality of laser diodes having a barrel shaped upper surface so that the plurality of laser diodes, when viewed collectively, have a wave-like shaped upper surface.

A lens may be positioned over the reflected laser light detector, and the plurality of laser modules may be positioned about the periphery of the lens.

The plurality of laser modules may be equally spaced about the periphery of the lens.

The plurality of laser modules may be unequally spaced about the periphery of the lens.

The interposer substrate of each of the plurality of laser modules may be carried adjacent the periphery of the lens at a level above the reflected light detector but below a top surface of the lens.

BRIEF DESCRIPTION OF THE DRAWINGS

FIG. 1 is a front view of a prior art smartphone design utilizing a prior art time of flight based depth sensor module.

FIG. 2 is a front view of a smartphone design utilizing a time of flight based depth sensor module disclosed herein.

DETAILED DESCRIPTION

Figure 3:
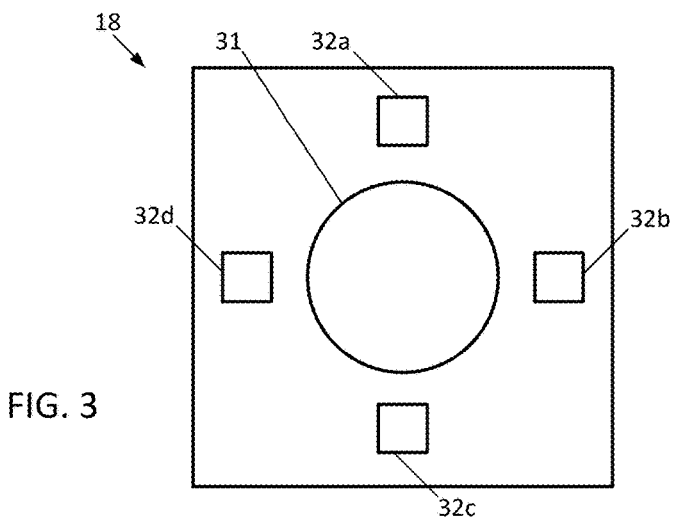
FIG. 3 is a top view of a first embodiment of a time of flight based depth sensor module disclosed herein, such as may be used with the smartphone design of FIG. 2.

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

A smartphone 15 utilizing a depth sensor module 18 is now described with reference to FIG. 2. The smartphone 15 includes a body 16, with a touch screen 17 located on the front face of the body. A notch 21 is defined in the touch screen 17 to permit placement of the depth sensor module 18, as well as a camera module 20, on the front face of the body 16.

A greatly enlarged top view of the depth sensor module 18 is shown in FIG. 3. Here, it can be seen that the depth sensor module 18 includes a centrally located lens 31 that focuses incoming light onto a sensing array 33 (see, for example, FIGS. 4, 5A-5B), and a plurality of vertical cavity surface emitting laser (VCSEL) modules 32a-32d positioned about the perimeter of the lens 31. This allows for the depth sensor module 18 to be compact, and for example, be positioned within a single small notch in the touch screen of a smartphone.

Figure 4:
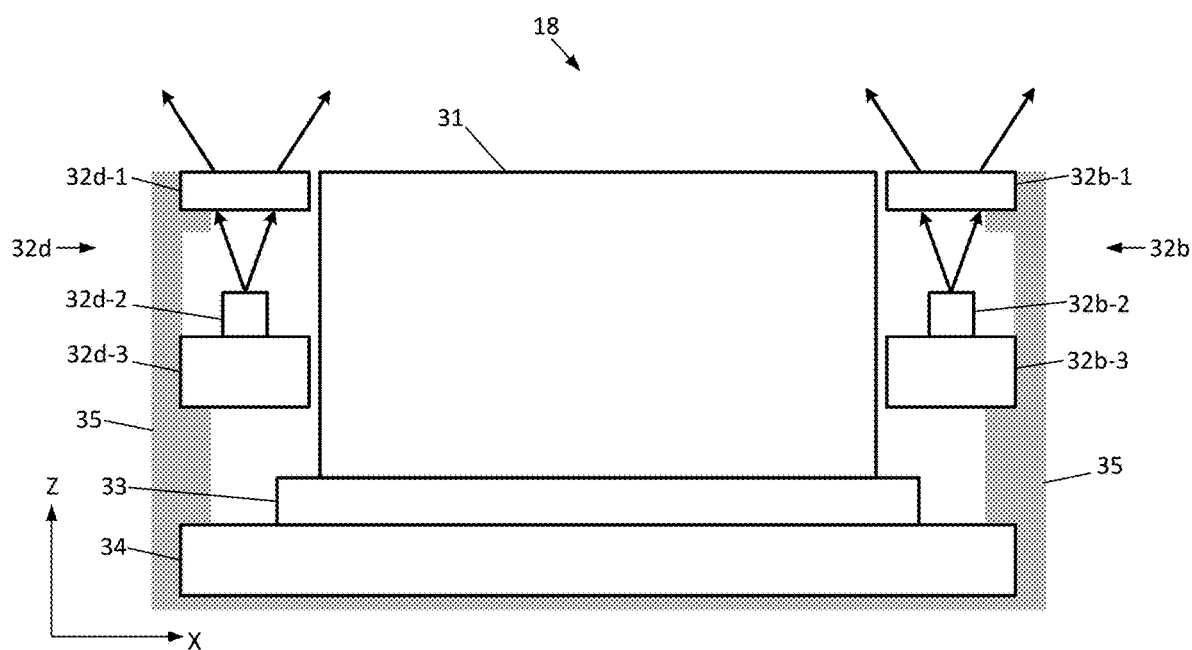
FIG. 4 is a diagrammatic cross sectional view of the time of flight based depth sensor module of FIG. 3.

A schematic cross sectional view of a first embodiment the depth sensor module 18 is shown in FIG. 4. Here, it can be seen that the depth sensor module 18 is formed by a printed circuit board (PCB) substrate 34 that carries the sensing array 33, the sensing array comprising an integrated circuit with an array of single photon avalanche diodes (SPADs). As stated, the centrally located lens 31 focuses incoming light into the sensing array 33.

The VCSEL module 32b is formed from an interposer substrate 32b-3 located (in the x-y directions) on the periphery of the lens 31, and is located (in the z-direction) above the sensing array 33. The interposer 32b-3 is carried by a supporting structure 35, which may be constructed from plastic, for example. A VCSEL array 32b-2 is carried by the interposer 32b-3, and a diffuser 32b-1 is located (in the x-y directions) on the periphery of the lens 31 and (in the z-direction) above and spaced apart from the VCSEL array 32b-2, with the top surface of the diffuser 32b-1 being level with a top surface of the lens 31. The diffuser 32b-1 functions to cause laser light emitted by the VCSEL array 32b-2 to diverge in a desired way on to the expected target area.

The VCSEL module 32d is formed from an interposer substrate 32d-3 located (in the x-direction) on the periphery of the lens 31, and is located (in the y-direction) above the sensing array 33. The interposer 32d-3 is carried by the supporting structure 35, or may be supported by a supporting layer formed on the PCB substrate 34 and/or an edge of the sensing array 33. A VCSEL array 32d-2 is carried by the interposer 32d-3, and a diffuser 32d-1 is located (in the x-direction) on the periphery of the lens 31 and (in the y-direction) above and spaced apart from the VCSEL array 32d-2, with the top surface of the diffuser 32d-1 being level with a top surface of the lens 31. The diffuser 32d-1 functions to cause laser light emitted by the VCSEL array 32d-2 to diverge in a desired way on to the expected target area.

Note that each VCSEL module 32 may have its own associated diffuser 32d. However, in some instances, there may be a single diffuser with a ring shaped cutout therein to permit passage of the lens 31 therethrough, and each VCSEL module 32 emits its lasers through a different portion of the single diffuser.

Also note that in the example shown, the interposer substrates 32d-3 and 32b-3 are not connected to one another, but are distinct interposer substrates that are separated from one another about the periphery of the lens 31.

The structures of the VCSEL modules 32a and 32c are not shown, but are the same as the structures of the VCSEL modules 32b and 32d. Any of the depth sensor modules used herein may have VCSEL modules with this design.

Figure 5A:
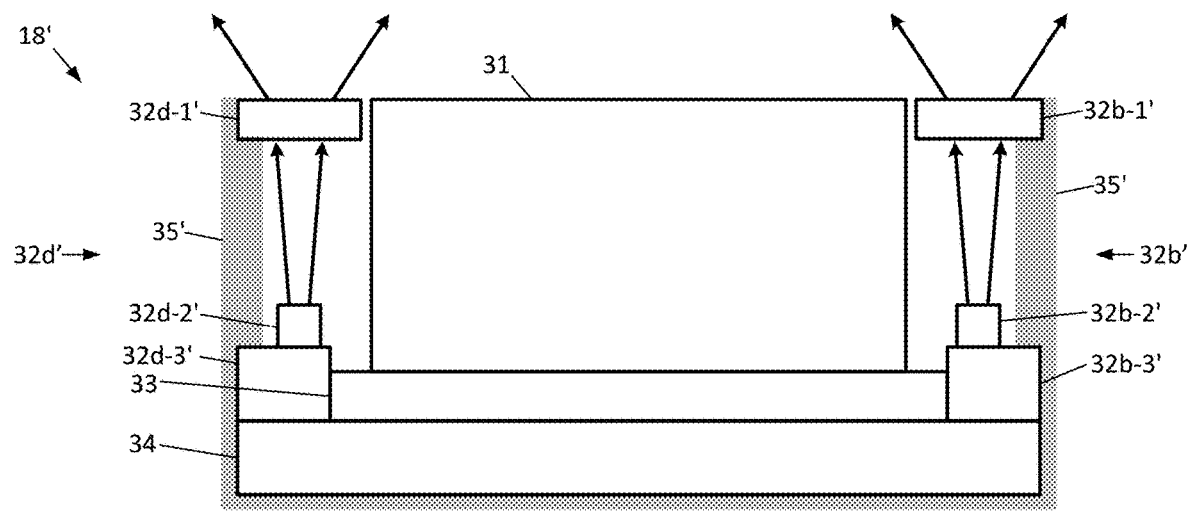
FIG. 5A is a diagrammatic cross sectional view of a second embodiment of a time of flight based depth sensor module disclosed herein in which the vertical cavity surface emitting lasers (VCSELs) have a top surface shaped so as to act as diffusers and the interposer carrying the VCSELs is carried by the printed circuit board, such as may be used with the smartphone design of FIG. 2.

A second embodiment of the depth sensor module 18' is shown in FIG. 5A. In this illustrated example, the interposers 32b-3' and 32d-3' are carried by the PCB 34, while the location of the diffusers 32b-1' and 32d-1' are still positioned along the z-axis (supported by the support structure 35') so as to have their upper surfaces approximately at the same level as the upper surface of the lens 31. So as to maintain sufficient geometrical constraint of the laser beams emitted by the VCSEL arrays 32b-2' and 32d-2' to prevent the laser beams from striking the lens 31 or support structure 35', the top surfaces of the VCSEL arrays 32b-2' and 32d-2' are shaped so as to act as an extra set of optics, such as a refractive or diffractive micro-lens, which act as a diffuser. The diffusers 32b-1' and 32d-1' then cause the lasers emitted by the VCSEL arrays 32b-2' and 32d-2' to diverge in a desired way onto the expected target area.

The structures of the VCSEL modules 32a' and 32c' are not shown, but are the same as the structures of the VCSEL modules 32b' and 32d'. Any of the depth sensor modules used herein may have VCSEL modules with this design.

Figure 5B:
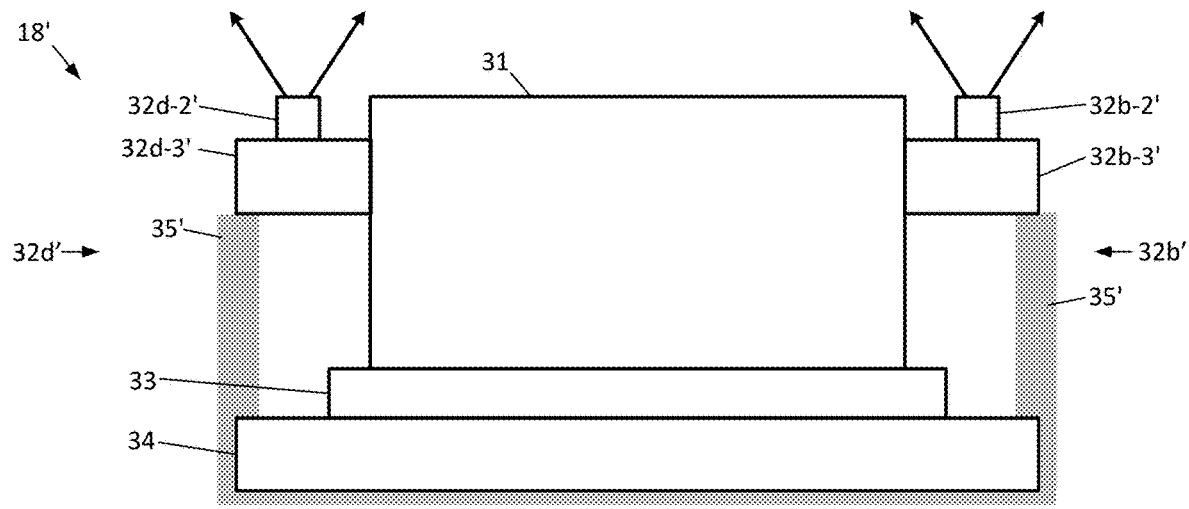
FIG. 5B is a diagrammatic cross sectional view of a third embodiment of a time of flight based depth sensor module disclosed herein in which the vertical cavity surface emitting lasers have a top surface shaped so as to act as diffusers and the interposer carrying the VCSELs is carried by a supporting structure so as to position the top surface of the VCSELs at generally the same level as the top surface of the lens, such as may be used with the smartphone design of FIG. 2.

A third embodiment of the depth sensor module 18' is shown in FIG. 5B. In this illustrated example, the interposers 32b-3' and 32d-3' are carried by the support structure 35' positioned such that the top surfaces of the VCSEL arrays 32b-2' and 32d-2' are generally even with the top surface of the lens 31, and there are no separate diffusers. Instead, the integrated diffusers within the VCSEL arrays 32b-2' and 32d-2' cause the emitted lasers to diverge in a desired way onto the expected target area.

The structures of the VCSEL modules 32a' and 32c' of the third embodiment are not shown, but are the same as the structures of the VCSEL modules 32b' and 32d'. Any of the depth sensor modules used herein may have VCSEL modules with this design.

Figure 6:
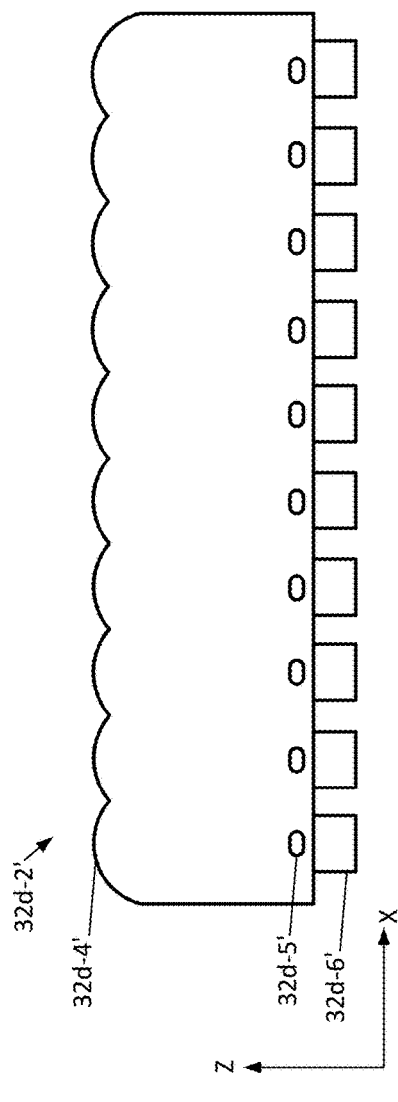
FIG. 6 is a cross sectional view of the vertical cavity surface emitting lasers of FIG. 5.
Figure 7:
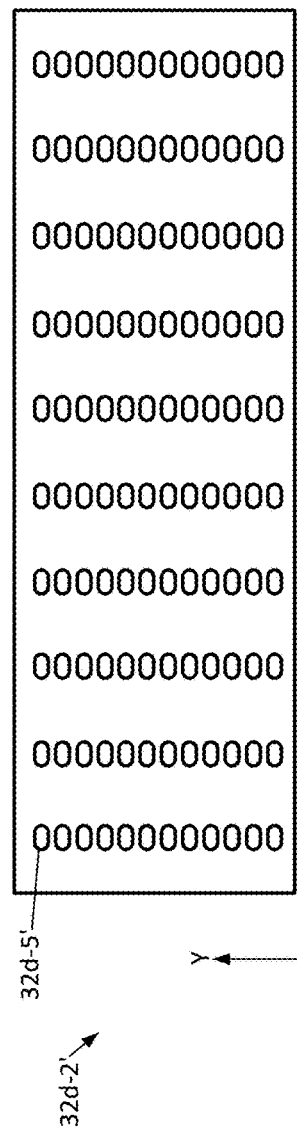
FIG. 7 is a top view of the diffuser of FIG. 6.
Figure 8:
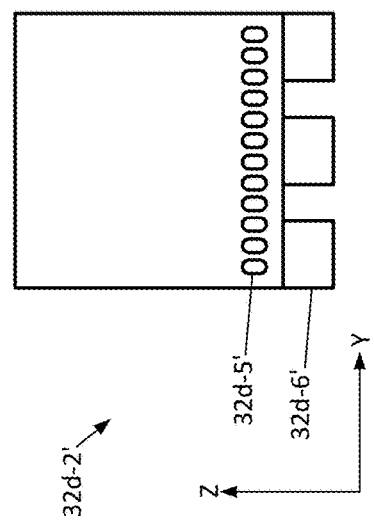
FIG. 8 is a side view of the diffuser of FIG. 6.

The specific structures making up the VCSEL arrays 32a-2', 32b-2', 32c-2' and 32d-2' are shown in FIGS. 6-8. FIG. 6 is a diagrammatic cross sectional view of one of the VCSEL arrays 32a-2', 32b-2', 32c-2' and 32d-2' in the x-z plane. As can be seen, the VCSEL arrays 32a-2', 32b-2', 32c-2' and 32d-2' are integrally formed as monolithic units from a semiconductor substrate, with laser emitters 32a-5', 32b-5', 32c-5', 32d-5' positioned toward the bottom of the VCSEL arrays 32a-2', 32b-2', 32c-2' and 32d-2' in the z-direction. The top surface of the VCSEL arrays 32a-2', 32b-2', 32c-2' and 32d-2' have a barrel-like (or lenticular) shape, such that, collectively, the top surfaces of the VCSEL arrays 32a-2', 32b-2', 32c-2' and 32d-2' have a wave-like shape. Therefore, the top surfaces of the VCSEL arrays 32a-2', 32b-2', 32c-2' and 32d-2' themselves are shaped so as to act as lenses for use in the embodiment of FIG. 5A, but can be shaped so as to act as diffusers in other embodiments.

A top view of the VCSEL arrays 32a-2', 32b-2', 32c-2' and 32d-2' in the x-y plane is shown in FIG. 7, where it can be seen that the VCSEL arrays 32a-2', 32b-2', 32c-2' and 32d-2' are comprised of, for example, 16 columns of laser emitters 32a-5', 32b-5', 32c-5', 32d-5' in the y-direction and 10 rows of laser emitters 32a-5', 32b-5', 32c-5', 32d-5' in the x-direction.

A side view of the VCSEL arrays 32a-5', 32b-5', 32c-5', 32d-5' in the z-y plane is shown in FIG. 8.

Figure 9:
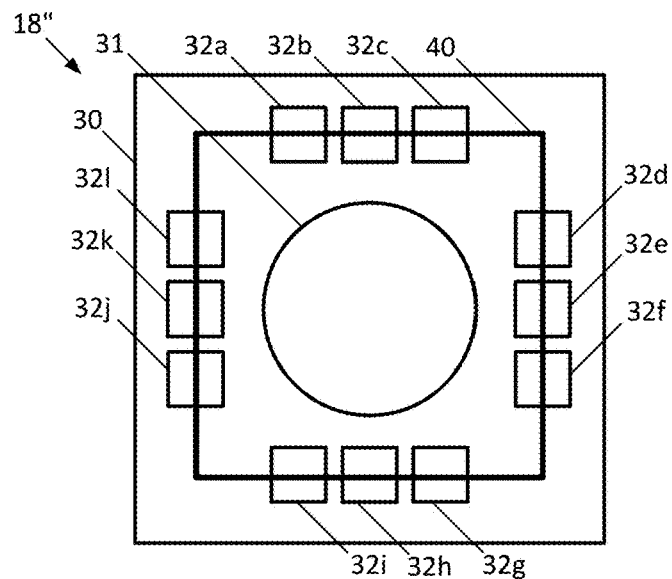
FIG. 9 is a top view of a fourth embodiment of a time of flight based depth sensor module disclosed herein, such as may be used with the smartphone design of FIG. 2.

A fourth embodiment of the depth sensor module 18" is shown in FIG. 9, where it can be seen that there are twelve VCSEL modules 32a-32l around the periphery of the lens 31, in four groups of three. Also shown in this embodiment (but optionally available in any embodiment) is a trace 40 for continuity testing. The trace 40 is formed within or withon the VCSEL modules 32a-32l. By performing a continuity test at the terminals of the trace 40, it can be inferred whether the lens 31 has moved and therefore whether the depth sensor module 18" has been damaged. If the continuity test is successful (meaning that current is able to flow between the terminals of the trace 40), it can be inferred that the lens 31 has not moved and that the depth sensor module 18" has not been damaged; on the other hand, if the continuity test is unsuccessful, it can be inferred that the lens 3 has moved and that the depth sensor module 18" has been damaged.

Figure 10:
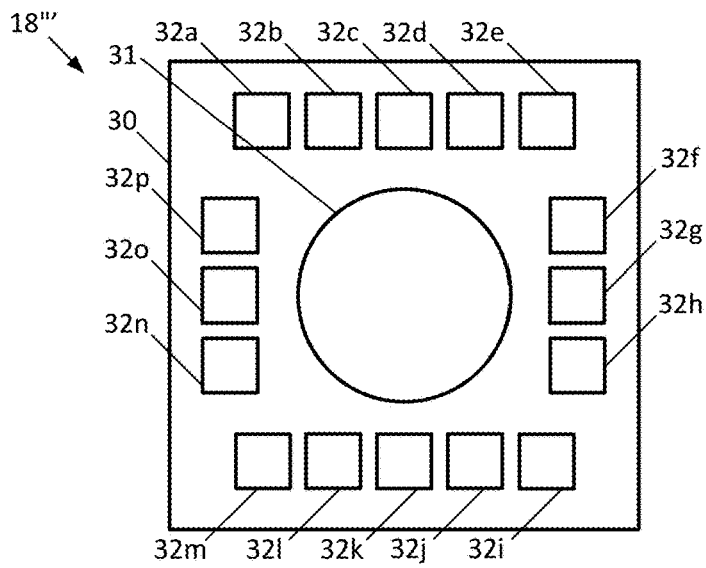
FIG. 10 is a top view of a fifth embodiment of a time of flight based depth sensor module disclosed herein, such as may be used with the smartphone design of FIG. 2.

A fifth embodiment of the depth sensor module 18''' is shown in FIG. 10, where it can be seen that there are sixteen VCSEL modules 32a-32p around the periphery of the lens 31, with four VCSEL modules 32a-32e and 32m-32i on opposite sides of the depth sensor module 18''', and three VCSEL modules 32f-32h and 32n-32p the other opposite sides of the depth sensor module 18'''.

In the examples shown above, each VCSEL module may be formed on its own interposer, such as with the cross sections shown in FIGS. 4, 5A-5B.

However, it should be understood that, in some cases, multiple VCSEL modules may share a same interposer. Such an example for depth sensor module module 18'''' is shown in FIG. 11, where the VCSEL modules 32a-32c share the interposer 36a, the VCSEL modules 32d-32f share the interposer 36b, the VCSEL modules 32g-32i share the interposer 36c, and the VCSEL modules 32j-32l share the interposer 36d.

Figure 11:
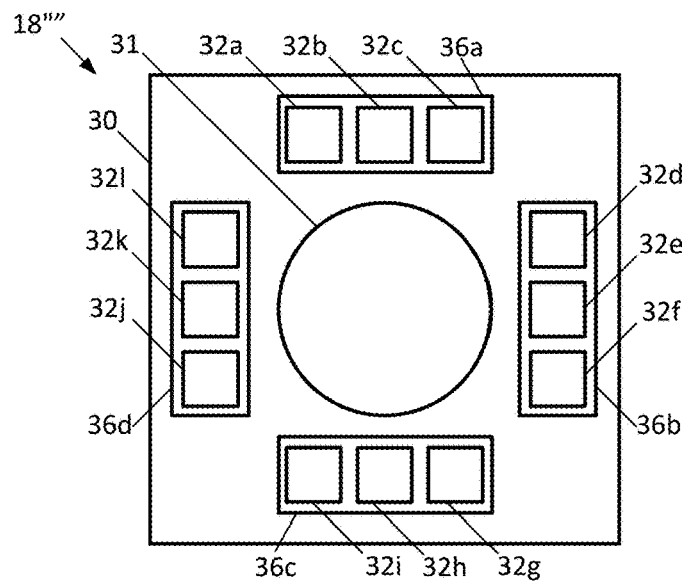
FIG. 11 is a top view of a sixth embodiment of a time of flight based depth sensor module disclosed herein, such as may be used with the smartphone design of FIG. 2.
Figure 12:
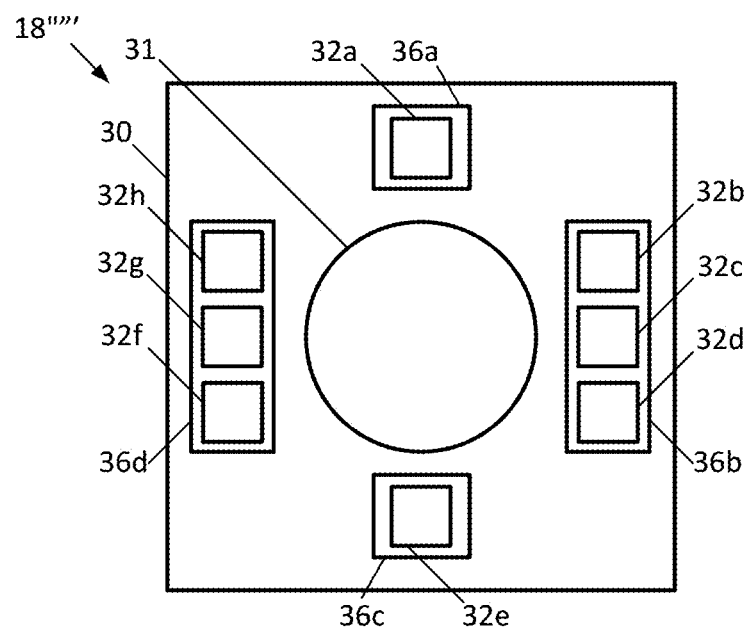
FIG. 12 is a top view of a seventh embodiment of a time of flight based depth sensor module disclosed herein, such as may be used with the smartphone design of FIG. 2.

While in the example of FIG. 11, each interposer is shared by three VCSEL modules, it is possible for different interposers to be shared by different numbers of VCSEL modules. Such an example depth sensor module 18''''' is shown in FIG. 12, where the VCSEL module 32a is the sole VCSEL module on the interposer 36a, the VCSEL modules 32b-32d each share the same interposer 36b, the VCSEL module 32e is the sole VCSEL module on the interposer 36c, and the VCSEL modules 32f-32h each share the same interposer 36d.

The various depth sensor modules disclosed herein have the advantage of permitting usage on the front face of a touch screen device with only a single cutout for the depth sensor module (rather than separate cutouts for the VCSELs and the lens). In addition, the various depth sensor modules enhance laser safety, since the emission of the laser beams occurs at spaced apart points and is therefore less concentrated than with prior art designs.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A time of flight sensing module, comprising:
a reflected laser light detector formed on a printed circuit board; and
a plurality of laser modules positioned about a periphery of the reflected laser light detector, each laser module comprising an interposer substrate vertically spaced apart from the printed circuit board, at least one laser diode carried by the interposer substrate, and a diffuser spaced apart from the interposer substrate and over the at least one laser diode; and a lens positioned over the reflected laser light detector, wherein the plurality of laser modules are positioned about the periphery of the lens, wherein the interposer substrate of each of the plurality of laser modules is carried adjacent the periphery of the lens at a level above the reflected light detector but below a top surface of the lens.

2. The time of flight sensing module of claim 1, wherein the plurality of laser modules are equally spaced about the periphery of the lens.

3. The time of flight sensing module of claim 1, wherein the plurality of laser modules are unequally spaced about the periphery of the lens.

4. The time of flight sensing module of claim 1, wherein the diffuser of each of the plurality of laser modules is carried adjacent the periphery of the lens at a level such that a top surface of the diffuser is even with a top surface of the lens.

5. The time of flight sensing module of claim 1, wherein at least two of the plurality of laser modules share a single common interposer, with the at least one laser diode and diffuser of each of the at least two of the plurality of laser modules being associated with that single common interposer.

6. The time of flight sensing module of claim 1, wherein at least two of the plurality of laser modules share a single common interposer, with the at least one laser diode and diffuser of each of the at least two of the plurality of laser modules being associated with that single common interposer; and wherein at least one of the plurality of laser modules does not share its interposer with others of the plurality of laser modules.

7. A time of flight sensing module, comprising:
a reflected laser light detector formed on a printed circuit board; and
a plurality of laser modules positioned about a periphery of the reflected laser light detector, each laser module comprising an interposer substrate and at least one laser diode carried by the interposer substrate, with the at least one laser diode having a barrel shaped upper surface so as to cause a desired divergence of laser light emitted by the at least one laser diode.

8. The time of flight sensing module of claim 7, further comprising a diffuser spaced apart from the interposer substrate and over the at least one laser diode.

9. The time of flight sensing module of claim 7, comprising a lens positioned over the reflected laser light detector; and wherein each laser module is positioned such that a top surface of its at least one laser diode is at a level even with a top surface of the lens.

10. The time of flight sensing module of claim 7, wherein each laser module is comprised of an interposer substrate and a plurality of laser diodes carried by the interposer substrate, with each of the plurality of laser diodes having a barrel shaped upper surface so that the plurality of laser diodes, when viewed collectively, have a wave-like shaped upper surface.

11. The time of flight sensing module of claim 7, further comprising a lens positioned over the reflected laser light detector, wherein the plurality of laser modules are positioned about the periphery of the lens.

12. The time of flight sensing module of claim 11, wherein the plurality of laser modules are equally spaced about the periphery of the lens.

13. The time of flight sensing module of claim 11, wherein the plurality of laser modules are unequally spaced about the periphery of the lens.

14. The time of flight sensing module of claim 11, wherein the interposer substrate of each of the plurality of laser modules is carried adjacent the periphery of the lens at a level above the reflected light detector but below a top surface of the lens.

* * * * *